US009612151B2

(12) United States Patent
Tachibana

(10) Patent No.: US 9,612,151 B2
(45) Date of Patent: Apr. 4, 2017

(54) WEIGHING DEVICE HAVING COVERED WEIGHING PAN

(71) Applicant: A&D Company, Limited, Tokyo (JP)

(72) Inventor: Masaki Tachibana, Saitama (JP)

(73) Assignee: A&D COMPANY, LIMITED, Tokyo (JP)

(*) Notice: Subject to any disclaimer, the term of this patent is extended or adjusted under 35 U.S.C. 154(b) by 83 days.

(21) Appl. No.: 14/442,575

(22) PCT Filed: Sep. 11, 2013

(86) PCT No.: PCT/JP2013/074480
§ 371 (c)(1),
(2) Date: May 13, 2015

(87) PCT Pub. No.: WO2014/080681
PCT Pub. Date: May 30, 2014

(65) Prior Publication Data
US 2016/0290853 A1 Oct. 6, 2016

(30) Foreign Application Priority Data

Nov. 20, 2012 (JP) .................................. 2012-253953

(51) Int. Cl.
*G01G 21/28* (2006.01)
*G01G 21/30* (2006.01)
*G01G 23/02* (2006.01)

(52) U.S. Cl.
CPC ........... *G01G 23/02* (2013.01); *G01G 21/286* (2013.01); *G01G 21/30* (2013.01); *G01G 21/28* (2013.01)

(58) Field of Classification Search
CPC ...... G01G 21/22; G01G 21/28; G01G 21/286; G01G 21/30; G01G 23/02
See application file for complete search history.

(56) References Cited

U.S. PATENT DOCUMENTS 4,884,645 A * 12/1989 Knothe .................. G01G 21/30
177/180
7,166,809 B2 * 1/2007 Desire .................... G01G 23/02
177/154

(Continued)

FOREIGN PATENT DOCUMENTS

FR 2486649 1/1982
JP U11986115935 7/1986

(Continued)

OTHER PUBLICATIONS

International Search Report PCT/JP2013/074480 and English translation thereof.

(Continued)

*Primary Examiner* — Randy Gibson
(74) *Attorney, Agent, or Firm* — Roberts Mlotkowski Safran Cole & Calderon P.C.

(57) ABSTRACT

As a weighing device which can not only make water and dust less likely to reach the sensor unit, but also simply discharge water having reached that position if any, and which further can improve the maintenance workability of water-washing of the sensor unit, an electronic balance includes a weighing pan, a load cell that measures a load of a measuring object placed on the weighing pan, and a scale main body case that supports the load cell. The load cell is disposed outside and over the scale main body case, a cylindrical transparent cover that covers the whole side face of the load cell is integrally provided for the weighing pan, and the lower end of the transparent cover is disposed with a clearance over an upper face of the scale main body case.

6 Claims, 5 Drawing Sheets

(56) References Cited

U.S. PATENT DOCUMENTS

| | | | |
|---|---|---|---|
| 8,525,051 B2* | 9/2013 | Hauck | G01G 21/28 177/124 |
| 2010/0236842 A1* | 9/2010 | Hauck | G01G 21/28 177/210 EM |
| 2016/0069737 A1* | 3/2016 | Canwell | G01G 21/22 177/238 |

FOREIGN PATENT DOCUMENTS

| | | |
|---|---|---|
| JP | Sho61-36897 | 10/1986 |
| JP | U11986173029 | 10/1986 |
| JP | U11992043232 | 4/1992 |
| JP | 2005-55340 | 3/2005 |
| JP | 2005-291765 | 10/2005 |

OTHER PUBLICATIONS

Written Amendment under Article 11 PCT/JP2013/074480 and English translation thereof.
Reply under article 34 PCT/JP2013/074480 and English translation thereof.

\* cited by examiner

WEIGHING DEVICE HAVING COVERED WEIGHING PAN

TECHNICAL FIELD

The present invention relates to a weighing device excellent particularly in drainability and maintainability.

BACKGROUND ART

Electronic balances are widely known as weighing devices. The electronic balances are devices that convert loads applied to weighing pans into electrical signals by sensor units such as load cells, and display the same as load values on display units, and have been used in various fields such as the food industry and the manufacturing industry. This type of electronic balance, commonly, has a sensor unit stored in the interior of a scale main body case and has a weighing pan disposed outside and over the scale main body case. Moreover, the weighing pan and sensor unit are coupled via an opening formed in an upper face of the scale main body case. Therefore, in such electronic balances, water and dust may enter from the opening in the upper face of the scale main body case.

To cope with such problems, as solutions thereto, Patent Literature 1 proposes a weighing device in which a diaphragm is provided for the opening in the upper face of the scale main body case and which prevents water and dust from entering into the scale main body case by the diaphragm, and Patent Literature 2 proposes a weighing device in which circular cylindrical drainers are provided on a lower side of the weighing pan and which prevents water from entering into the scale main body case by the drainers.

CITATION LIST

Patent Literature

Patent Literature 1: Japanese Published Unexamined Patent Application No. 2005-291765
Patent Literature 2: Japanese Published Examined Utility Model Application No. S61-36897

SUMMARY OF INVENTION

Technical Problem

However, in the above-described weighing devices, for both of which waterproofing and/or dustproofing is performed for a scale main body case after a sensor unit is stored in the interior of the scale main body case, when water and/or dust once enter into the scale main body case and reach the position of the sensor unit, discharge of the same cannot be easily performed.

Also, in the above-described weighing devices, the sensor unit is stored in the scale main body case, and the sensor unit cannot simply be externally exposed. Therefore, the situation is not favorable in terms of maintenance workability such as water-washing of the sensor unit.

The present invention has been made in view of such circumstances, and an object thereof is to provide a weighing device which can not only make water and dust less likely to reach the sensor unit, but even if water reaches the position of the sensor unit, can also simply discharge the water, and which further can improve the maintenance workability of water-washing and the like of the sensor unit.

Solution to Problem

In order to achieve the above-mentioned object, a first aspect of the invention is a weighing device including a weighing pan on which a measuring object is placed, a sensor unit that measures a load applied to the weighing pan, and a scale main body case that supports the sensor unit, in which the sensor unit is disposed outside as well as over the scale main body case, for the weighing pan, a cylindrical cover that covers a whole side face of the sensor unit is integrally provided, and a lower end of the cover is separated upward with respect to an upper face of the scale main body case.

According to the present invention, covering the periphery of the sensor unit with a cylindrical cover allows the cover to serve a windproofing role, while even if water reaches the position of the sensor unit, because the lower end of the cover is separated upward with respect to the upper face of the scale main body case, allows draining the water through a section between the lower end of the cover and the upper face of the scale main body case by causing the same to run on the upper face of the scale main body case.

Also, according to the present invention, because the sensor unit is disposed outside the scale main body case, water-washing of the sensor unit can be performed.

A second aspect of the invention is the first aspect of the invention, in which on the upper face of the scale main body case, a drain guide face using an upper face outer edge of said scale main body case as a downstream end is formed, and the drain guide face is inclined so as to become higher toward an upstream side than at the downstream side. According to the present invention, drainability on the upper face of the scale main body case can be further improved by use of the inclination of the drain guide face.

A third aspect of the invention is the first or second aspect of the invention, in which on the upper face of the scale main body case, a plurality of projecting portions that project upward are provided outside of the cover, and the respective projecting portions have their respective upper ends disposed opposite to the weighing pan, and make contact with said weighing pan to serve as stoppers when an overload is applied to said weighing pan. According to the present invention, the scale main body case is provided with a plurality of projecting portions, and the respective projecting portions act as anti-overloading stoppers. Because the respective projecting portions are disposed outside of the cover, blocking of drainage by the projecting portion as in the case where the projecting portion is disposed in the interior of the cover does not occur, and drainability can be maintained while overloading can be prevented.

A fourth aspect of the invention is the third aspect of the invention, in which at least one of the plurality of projecting portions is a display unit that displays a weighed value. According to the present invention, the display unit can be used as an anti-overloading stopper.

A fifth aspect of the invention is the third or fourth aspect of the invention, in which at least one of the plurality of projecting portions is disposed in a rear face corner portion of the scale main body case.

A sixth aspect of the invention is any one of the first to fifth aspects of the invention, in which on the upper face of the scale main body case, at a position to attach the sensor unit, an upwardly projecting base is provided, and the sensor unit is attached on the base. According to the present invention, because a base is provided on the upper face of the scale main body case and a sensor unit is attached to the base, the sensor unit can be disposed at a position raised further than the upper face of the scale main body case. Thus, even when wind enters from the section between the upper face of the scale main body case and the lower end of the cover, the wind can be made less likely to directly hit the sensor unit, so that adhesion of water and dust to the sensor unit can be further suppressed. Also, according to the present invention, because the sensor unit is disposed at a position raised further than the upper face of the scale main body case, water having reached the position of the sensor unit flows down onto the upper face of the scale main body case from the high position, and retention of water in the position of the sensor unit can be prevented.

Advantageous Effects of Invention

According to the present invention, the cover can be made to serve a windproofing role, while even if water reaches the position of the sensor unit, the water can be drained through a section between the lower end of the cover and the upper face of the scale main body case, and therefore, not only can water and dust be made less likely to reach the sensor unit, but even if water reaches the position of the sensor unit, the water can also be simply discharged.

Also, according to the present invention, because the sensor unit can be washed with water, the maintenance workability can be improved.

DESCRIPTION OF EMBODIMENTS

Figure 1:
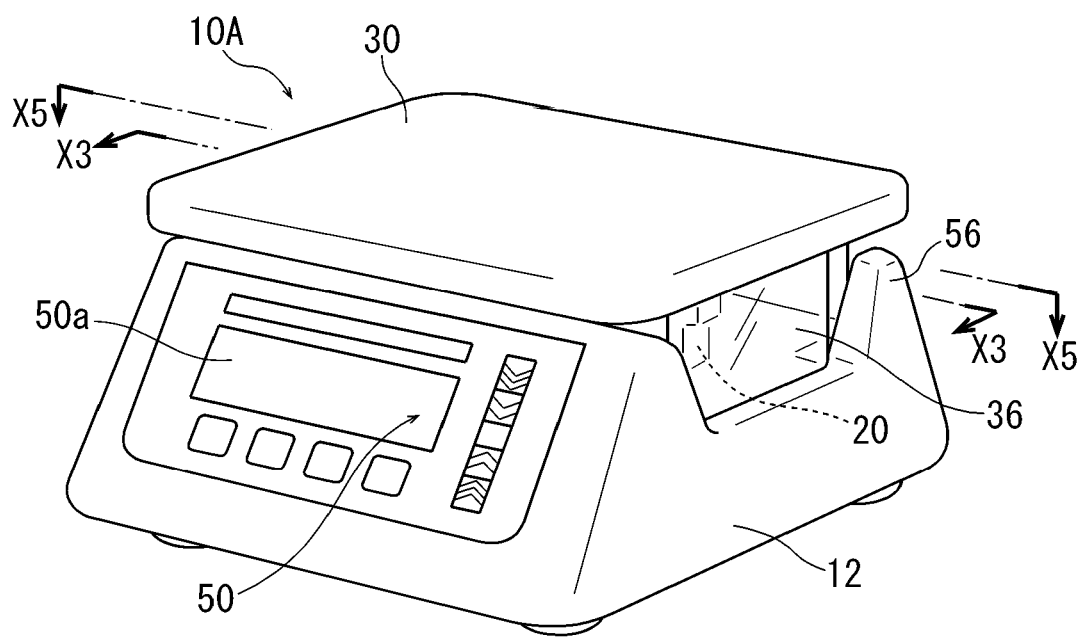
FIG. 1 is a front perspective view showing an electronic balance according to a first embodiment of the present invention.
Figure 2:
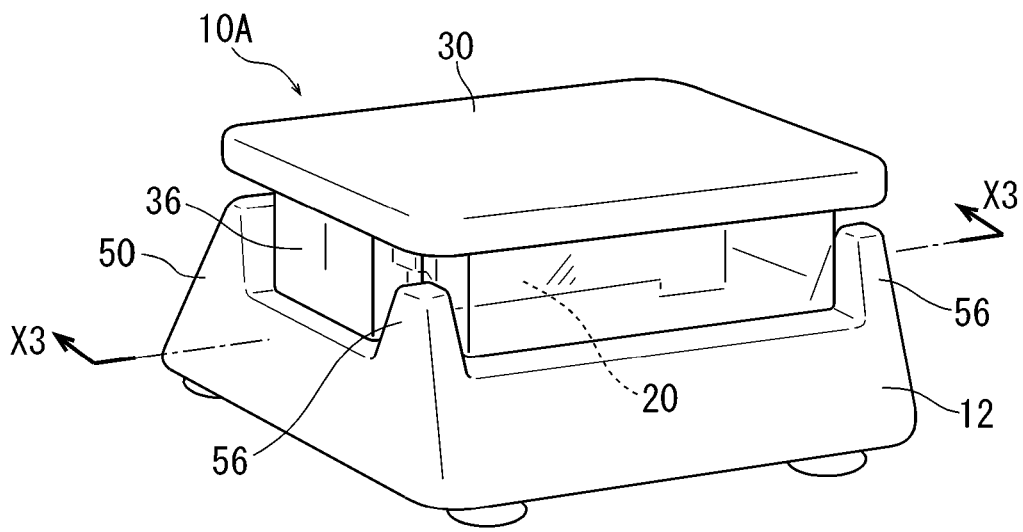
FIG. 2 is a rear perspective view of the same electronic balance.

Hereinafter, embodiments of the present invention will be described based on the drawings.

FIG. 1 to FIG. 5 show an electronic balance 10A according to a first embodiment of the present invention.

The electronic balance 10A, as shown in FIG. 1 to FIG. 5, includes a display unit 50 at its front face side (front side). The display unit 50 is disposed standing with a hollow longitudinal wall form, and a liquid crystal screen 50$a$ is provided on a front face of the display unit 50. In the display unit 50, an electronic circuit board 40 that arithmetically processes an output detected in a load cell 20 to be described later and controls data to be displayed on the liquid crystal screen 50$a$ is disposed at a back side of the liquid crystal display 50$a$.

At a rear face of the above-mentioned display unit 50, as shown in FIG. 1 to FIG. 5, to its lower region, a synthetic resin-made scale main body case 12 formed in a substantially rectangular shape in a plan view is integrally connected. The scale main body case 12 maintains a horizontal width that is identical to the horizontal width of the display unit 50 while extending rearward, and its interior continues into the display unit 50.

The scale main body case 12 has an upper face 12$a$. The scale main body case upper face 12$a$ is curved so as to be the highest at a substantially central portion and become lower further to the outside (outer edge) than the substantially central portion, and the whole face of the scale main body case upper face 12$a$ ranging from its substantially central portion to an outer peripheral edge portion centered on its substantially central portion constitutes an inclined drain guide face 12A. Therefore, even if water exists on the upper face 12$a$ of the scale main body case 12, the water naturally flows to the outer edge side of the scale main body case upper face 12$a$ to be drained to the outside of the scale main body case 12. Furthermore, in the present embodiment, an inclined face 12Aa is formed in laterally opposite peripheral edge portions and a rear peripheral edge portion of the scale main body case 12 in order to enhance the above-described draining function, and its inclination angle is greater than that of other parts.

On the upper face 12$a$ of the scale main body case 12, as shown in FIG. 1, FIG. 2, FIG. 4, and FIG. 5, hollow projecting portions 56 are formed in right and left corner portions at a rear side (rear face side) of the scale main body case 12, respectively. The hollow projecting portions 56 are formed such that their upper ends are identical in height to the upper end of the display unit 50, and over the upper face 12$a$ of the scale main body case 12, a load cell housing chamber S surrounded by the hollow display unit 50 and the pair of right and left hollow projecting portions 56 and 56 is formed. Outside faces of the hollow projecting portions 56 are formed to be flush with outside faces of the scale main body case 12, so that unification in the appearance design from side and behind of the electronic balance 10A is achieved.

Figure 3:
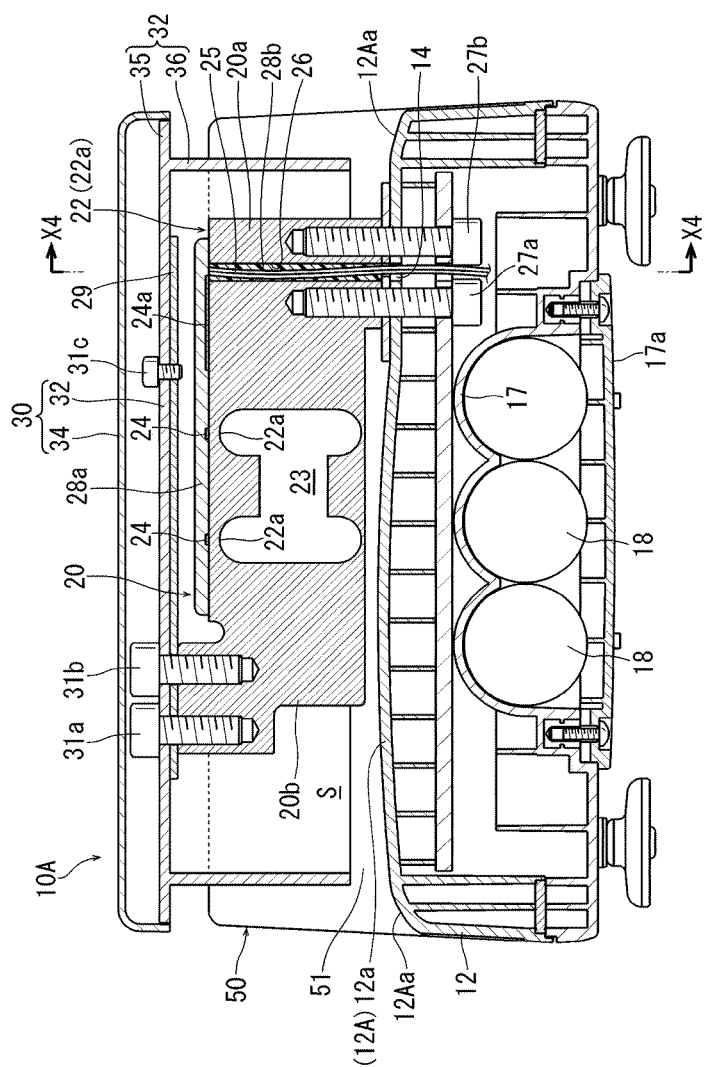
FIG. 3 is a longitudinal sectional view of the same electronic balance (a sectional view taken along a line III-III shown in FIG. 1).

In the scale main body case 12, as shown in FIG. 3, a battery housing chamber 17 that houses dry cell batteries 18 serving as a power supply is defined. The battery housing chamber 17 is opened at a bottom face side of the case 12, and by removing a cover 17$a$ assembled on its opening portion, replacement of the dry cell batteries 18 can be performed.

On the upper face 12$a$ of the above-described scale main body case 12, as shown in FIG. 2 to FIG. 5, a load cell 20 is disposed. The load cell 20 is fixed at its fixed-side end portion 20$a$ to the upper face 12$a$ of the scale main body case 12 by use of fixing screws 27$a$ and 27$b$, and accordingly, the load cell 20 horizontally extends in the lateral direction (in FIG. 3, in the right and left direction) with a cantilevered form.

The load cell 20 includes a metallic rectangular block-like elastic body 22 provided with a spectacle-shaped side face through-hole 23 that define elastic portions. Strain gauges 24 are stuck on an upper face of upper elastic portions 22$a$ of the elastic body 22, and on an upper face of the elastic body 22, a flexible printed circuit board 24$a$ that is electrically connected with the strain gauge 24 to constitute a bridge circuit such as a resistor for output compensation is stuck. In the fixed-side end portion 20$a$ of the load cell 20, a vertical through-hole 26 is formed (refer to FIG. 3 and FIG. 4). The vertical through-hole 26 communicates with the interior of the case 12 via a vertical through-hole 14 provided in an upper face wall of the scale main body case 12, and through the vertical through-holes 26 and 14, an electrical wiring 25 that is led out of the above-described flexible printed circuit board 24a is inserted. The electrical wiring 25, after being led into the scale main body case 12 in a manner penetrating through the vertical through-holes 26 and 14, is connected to the electronic circuit board 40 in the above-mentioned display unit 50 via a relay circuit board 16 (refer to FIG. 4) in the case 12.

For such an elastic body 22, a silicone insulating coating 28a is provided at its upper face side, and in the vertical through-hole 26, a silicone material 28b serving as a sealing means is filled. The silicone insulating coating 28a covers the electrical components (strain gauges 24 and flexible printed circuit board 24a) and the electrical wiring 25 to ensure insulation and waterproofing in conductive portions of the electrical components, and the silicone material 28b reliably seals the interior of the scale main body case 12.

In the present embodiment, because the vertical through-hole 26 for inserting the electrical wiring 25 therethrough is opened at the upper face side of the elastic body 22 on which the electrical components such as the strain gauges 24 are mounted, the electrical wiring 25 that connects (the electrical components mounted on) the load cell 20 and the electronic circuit board 40 disposed in the scale main body case 12 fits in without sticking out to the right and left from the upper face of the elastic body 22. Therefore, it becomes easy to form the insulating coating 28a for waterproofing on the conductive portions of the electrical components exposed on the upper face of the elastic body 22, and also, when carrying the load cell 20 or assembling as an electronic balance, there is no longer a possibility that the insulating coating 28a is stripped by the electrical wiring 25 being caught on something.

Figure 4:
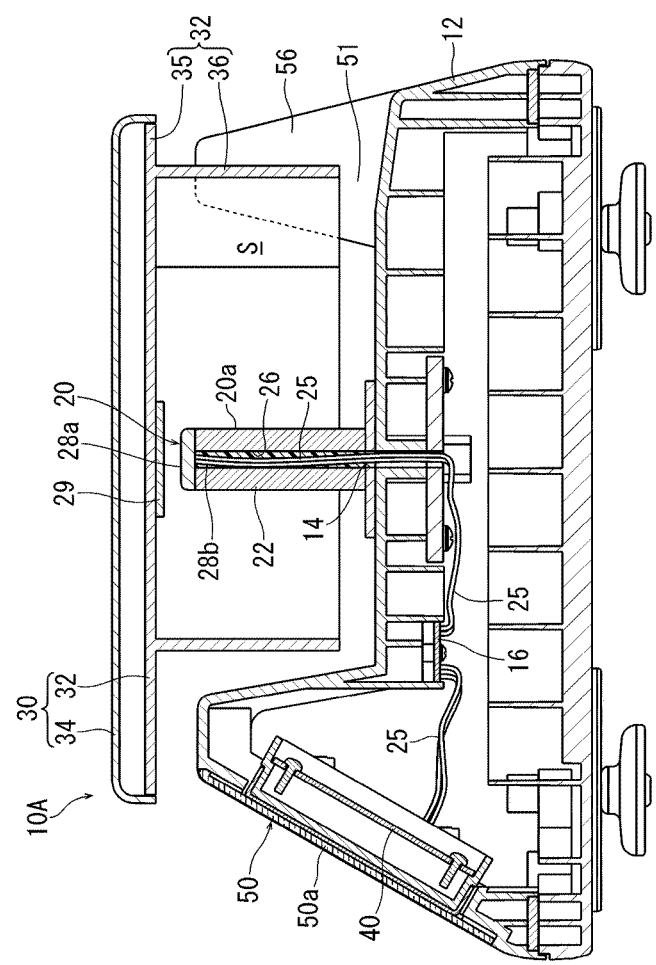
FIG. 4 is a longitudinal sectional view of the same electronic balance (a sectional view taken along a line IV-IV shown in FIG. 3).
Figure 5:
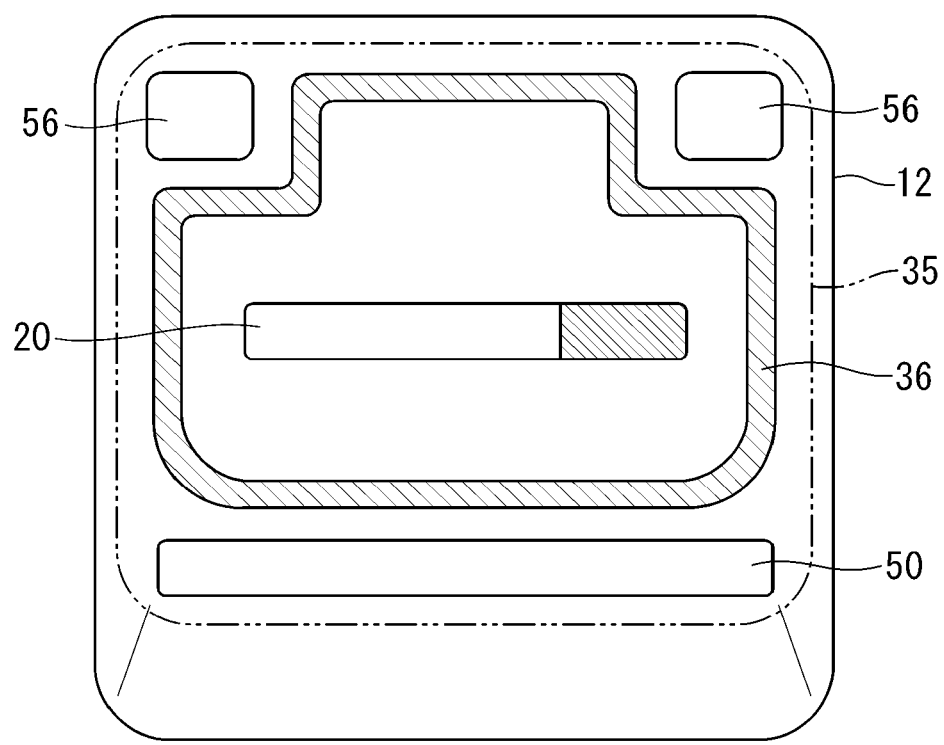
FIG. 5 is a cross-sectional view of the same electronic balance (a sectional view taken along a line V-V shown in FIG. 1).

To a movable-side end portion 20b of the above-mentioned load cell 20, as shown in FIG. 3 and FIG. 4, a weighingpan 30 on which a measuring object is placed is coupled. The weighing pan 30 is composed of a transparent synthetic resin-made pan main body 32 to be coupled to the movable-side end portion 20b of the load cell 20 and a synthetic resin-made pan cover 34 to cover an upper face side of the pan main body 32.

The pan main body 32 is formed by integrally molding a substantially rectangular-shaped top panel portion 35 and a cylindrical-shaped transparent cover 36. The top panel portion 35 is coupled using a fixing screw 31C to a coupling plate 29 that is fixed to an upper face of the movable-side end portion 20b of the load cell 20 by use of fixing screws 31a and 31b. The top panel portion 35 is formed in substantially the same shape as the pan cover 34, and the pan cover 34 is freely attatchably and detachably fitted onto the top panel portion 35.

The transparent cover 36 is, as shown in FIG. 2 to FIG. 5, extended downward from a lower face of the top panel portion 35. The transparent cover 36, in a plan view, occupies a smaller proportion than that of the top panel portion 35, and is formed in a convex shape as a whole. Therefore, the top panel portion 35 is in a state of sticking out to the outside, with respect to the transparent cover 36, at one side of its near side and both corner portions of its rear face side (rear side), and in a region under this part, the above-mentioned display unit 50 and the above-mentioned hollow projecting portions 56 are disposed (refer to FIG. 5). The display portion 50 and the hollow projecting portions 56 are disposed outside of the transparent cover 36, and their respective upper ends are disposed opposite to the top panel portion 35 and with a predetermined clearance in the vertical direction. Thus, when an overload is applied to the weighing pan 30, the upper end of the display unit 50 and the upper ends of the hollow projecting portions 56 come into contact with the top panel portion 35 of the pan main body 32, so that the overload is prevented from acting on the load cell 20.

The transparent cover 36, as shown in FIG. 2 to FIG. 5, surrounds with a clearance the periphery of the load cell 20 arranged in a load cell arrangement space S. The lower end of the transparent cover 36 is, over the scale main body case upper face 12a, disposed with a predetermined clearance 51 with respect to the upper face 12a of the scale main body case 12, and the clearance 51 is formed slightly greater than a clearance between the foregoing display unit 50 and the top panel portion 35 and the clearance between the upper end of the hollow projecting portion 56 and the top panel portion 35. Therefore, at the time of overloading, the lower end of the transparent cover 36 and the upper face of the scale main body case 12 do not contact, and as described above, the upper end of the display unit 50 and/or the upper ends of the hollow projecting portions 56 come into contact with the top panel portion 35 of the pan main body 32.

Next, the operation of the electronic balance 10A configured as above will be described.

In the above-described electronic balance 10A, because the load cell 20 is disposed outside as well as over the scale main body case 12 and the clearance 51 is provided between the transparent cover 36 and the upper face 12a of the scale main body case 12, when a liquid enters the load cell arrangement space S, the liquid flows on the scale main body case upper face 12a, and is externally drained through the clearance 51 between the transparent cover 36 and the scale main body case upper face 12a.

Also, because the upper face 12a of the scale main body case 12 is inclined constituting the drain guide face 12A, even if water exists on the upper face 12a of the scale main body case 12, the water is naturally externally drained.

Further, because the display unit 50 and the hollow projecting portions 56 are disposed outside of the transparent cover 36, obstruction in drainage in the interior of the transparent cover 36 as in the case where the display unit 50 and the hollow projecting portions 56 are disposed in the interior of the transparent cover 36 does not occur, and drainage is reliably performed. Therefore, in the electronic balance 10A, water having entered the load cell arrangement space S can be externally smoothly drained without causing retention in the interior.

Also, in the electronic balance 10A, because the cylindrical transparent cover 36 is disposed so as to cover the whole side face of the load cell 20, the transparent cover 36 acts as windproofing, which enables high-precision weighing. Further, because dust and dirt, etc., can be kept out of the load cell arrangement space S by the transparent cover 36, contamination of the load cell arrangement space S (peripheral region of the load cell 20) can be suppressed.

Further, in the electronic balance 10A, because the cylindrical transparent cover 36 is integrally provided for the weighing pan 30, the transparent cover 36 is removed by only removing the weighing pan 30, so that the load cell 20 is exposed. Specifically, by removing the pan cover 34 of the weighing pan 30 from the pan main body 32 and removing the fixing screw 31c to remove the pan main body 32 integrally with the transparent cover 36, the load cell arrangement space S as a whole is opened. Because the load cell 20 can thus be simply exposed, in the present embodiment, maintenance such as washing can be easily performed. Furthermore, in the present embodiment, the degree of contamination of the peripheral region of the load cell 20 can be externally visually checked through the transparent cover 36, and the weighing pan 30 can be removed according to necessity to wash the contamination of the peripheral region of the load cell 20.

Figure 6:
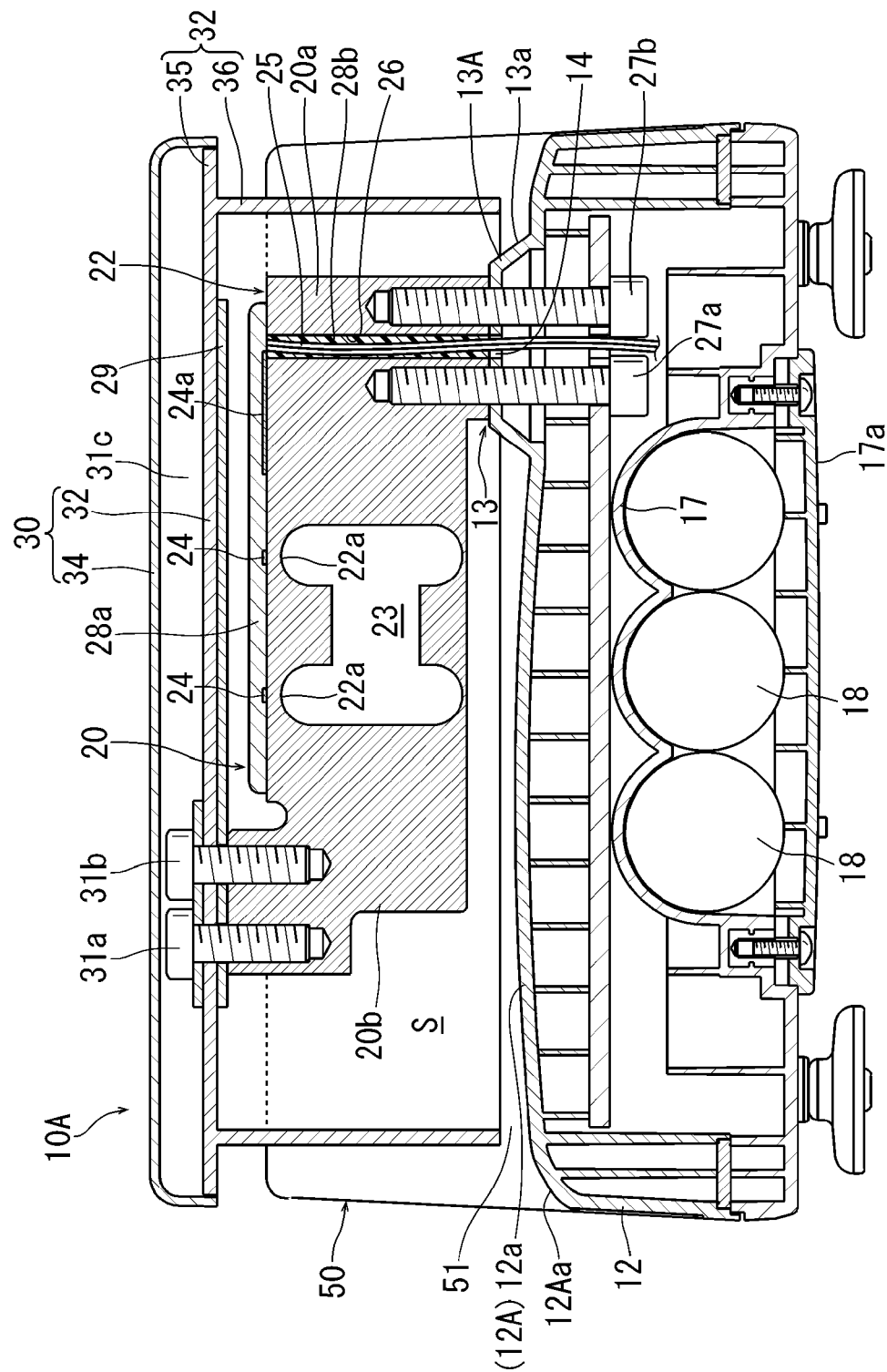
FIG. 6 is a longitudinal sectional view showing an electronic balance according to a second embodiment of the present invention.

In the present embodiment, the fixed-side end portion 20a of the load cell 20 is fixed at the height position of the upper face 12a of the scale main body case 12, but the present invention is not limited thereto. For example, as shown in FIG. 6, a base 13 may be provided on the upper face of the scale main body case 12 to fix the fixed-side end portion 20a of the load cell 20 to the base 13. The base 13 shown in the same figure is formed to be substantially horizontal at the highest position, and the load cell 20 is fixed to this position. Also, an inclined portion 13A is provided around the base 13, and the surface of the inclined portion 13A is provided as an inclined face 13a that is lower at the outside than at the inside. When such a base 13 is provided, the load cell 20 becomes hardly visible through the clearance 51 between the transparent cover 36 and the scale main body case upper face 12a, which allows preventing wind having entered from the clearance 51 from directly hitting the load cell 20. Also, because the load cell 20 is disposed at the raised position, water in the position of the load cell 20 is reliably drained.

Although embodiments have been described above, the present invention includes the following modes.

(1) The shape of the scale main body case upper face 12a that constitutes the drain guide face 12A is not limited to the shape according to the embodiment described above, but suffices with a shape having such an inclined face that water on the scale main body case upper face 12a flows to the outside. For example, the whole of the scale main body case upper face 12a may be provided as an inclined face that is lowered from the right side to the left side in FIG. 3, and may be provided as an inclined face that is the highest at the position to fix the load cell 20 and is gradually lowered toward the outside. Further, the scale main body case 12 may be included only in part, without inclining the whole thereof (the drain guide face 12A may be formed in a part of the scale main body case upper face 12a).

(2) As the load cell 20, a variety of load cells can be used.

REFERENCE SIGNS LIST

10A Electronic balance (weighing device)
12 Scale main body case
12a Scale main body case upper face
12A Drain guide face
13 Base
13A Base inclined portion
13a Base inclined face
20 Load cell (sensor unit)
30 Weighing pan
32 Pan main body
34 Pan cover
36 Transparent cover (cover)
50 Hollow standing wall-like display unit
51 Clearance
56, 56A Hollow projecting portion

The invention claimed is:

1. A weighing device including a weighing pan on which a measuring object is placed, a sensor unit that measures a load applied to the weighing pan, and a scale main body case that supports the sensor unit, wherein
   the sensor unit is disposed outside as well as over the scale main body case,
   for the weighing pan, a tubular cover that directly and substantially covers a whole side face of the sensor unit is integrally provided such that the tubular cover provides a windproofing barrier for the sensor unit, the cover being, in a plan view, formed smaller than the weighing pan, and
   a lower end of the cover is separated upward with respect to an upper face of the scale main body case, so that a clearance is formed between said lower end of the cover and said upper face of the scale main body case.

2. The weighing device according to claim 1, wherein
   on the upper face of the scale main body case, a drain guide face using an upper face outer edge of said scale main body case as a downstream end is formed, and
   the drain guide face is inclined so as to become higher toward an upstream side than at the downstream side.

3. The weighing device according to claim 1, wherein
   on the upper face of the scale main body case, a plurality of projecting portions that project upward are provided outside of the cover, and
   the respective projecting portions have their respective upper ends disposed opposite to the weighing pan, and make contact with said weighing pan to serve as stoppers when an overload is applied to said weighing pan.

4. The weighing device according to claim 3, wherein
   at least one of the plurality of projecting portions is a display unit that displays a weighed value.

5. The weighing device according to claim 3, wherein
   at least one of the plurality of projecting portions is disposed in a rear face corner portion of the scale main body case.

6. The weighing device according to any one of claim 1, wherein
   on the upper face of the scale main body case, at a position to attach the sensor unit, an upwardly projecting base is provided, and
   the sensor unit is attached on the base.

* * * * *